Figure 3:
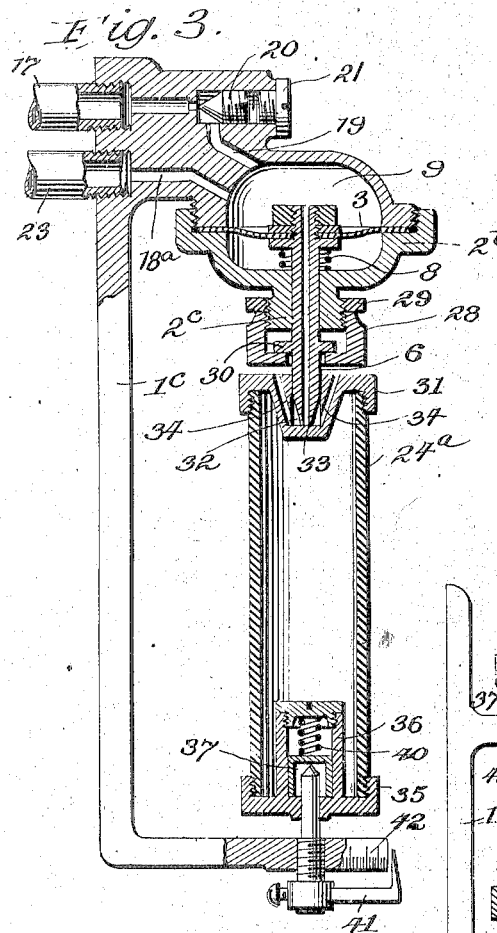

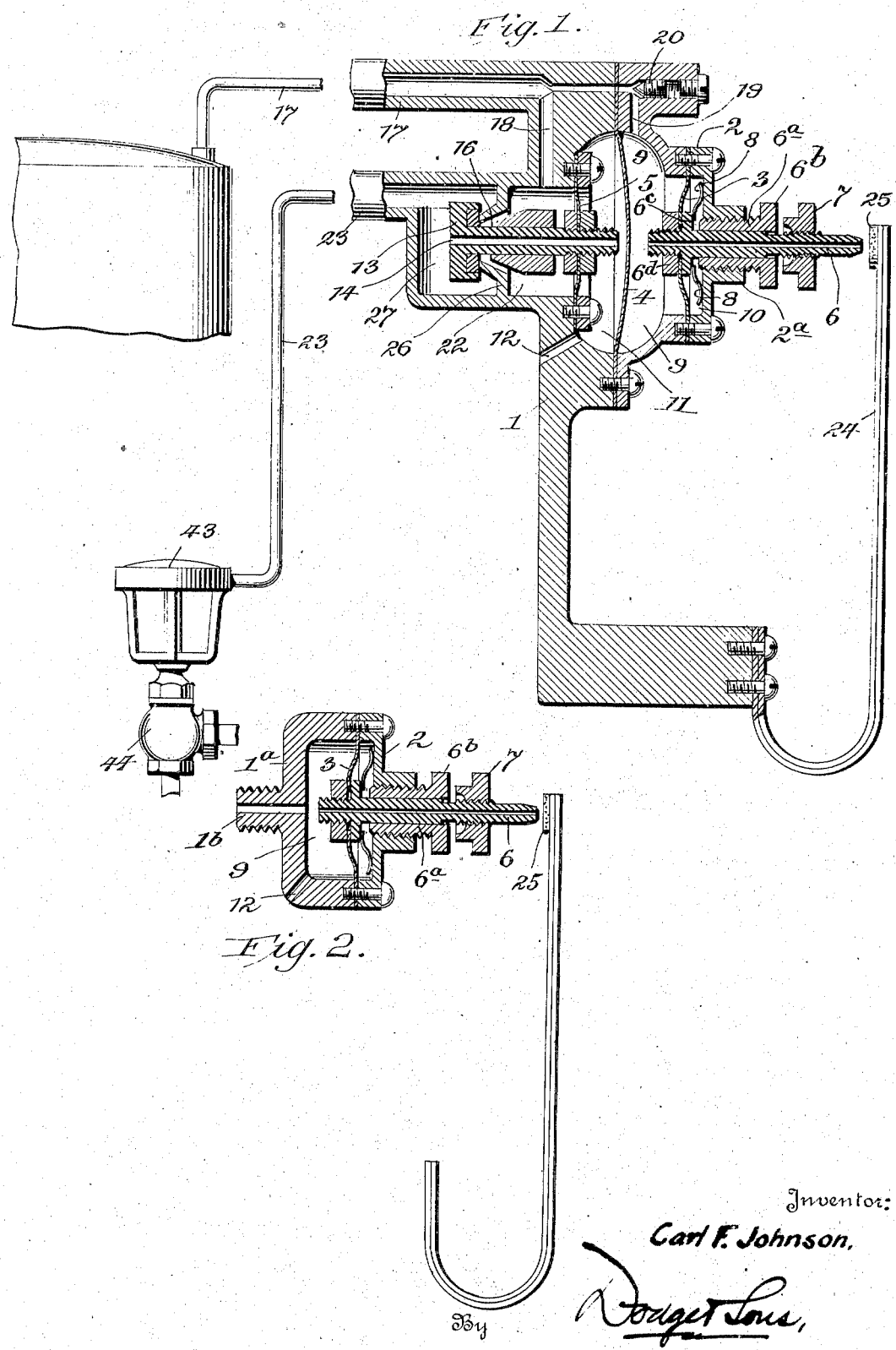

C. F. JOHNSON.
AUTOMATIC CONTROL DEVICE.
APPLICATION FILED MAR. 12, 1918.

1,312,253.

Patented Aug. 5, 1919.
3 SHEETS—SHEET 2.

Inventor:
Carl F. Johnson,
By Dodge Sons,
Attorneys.

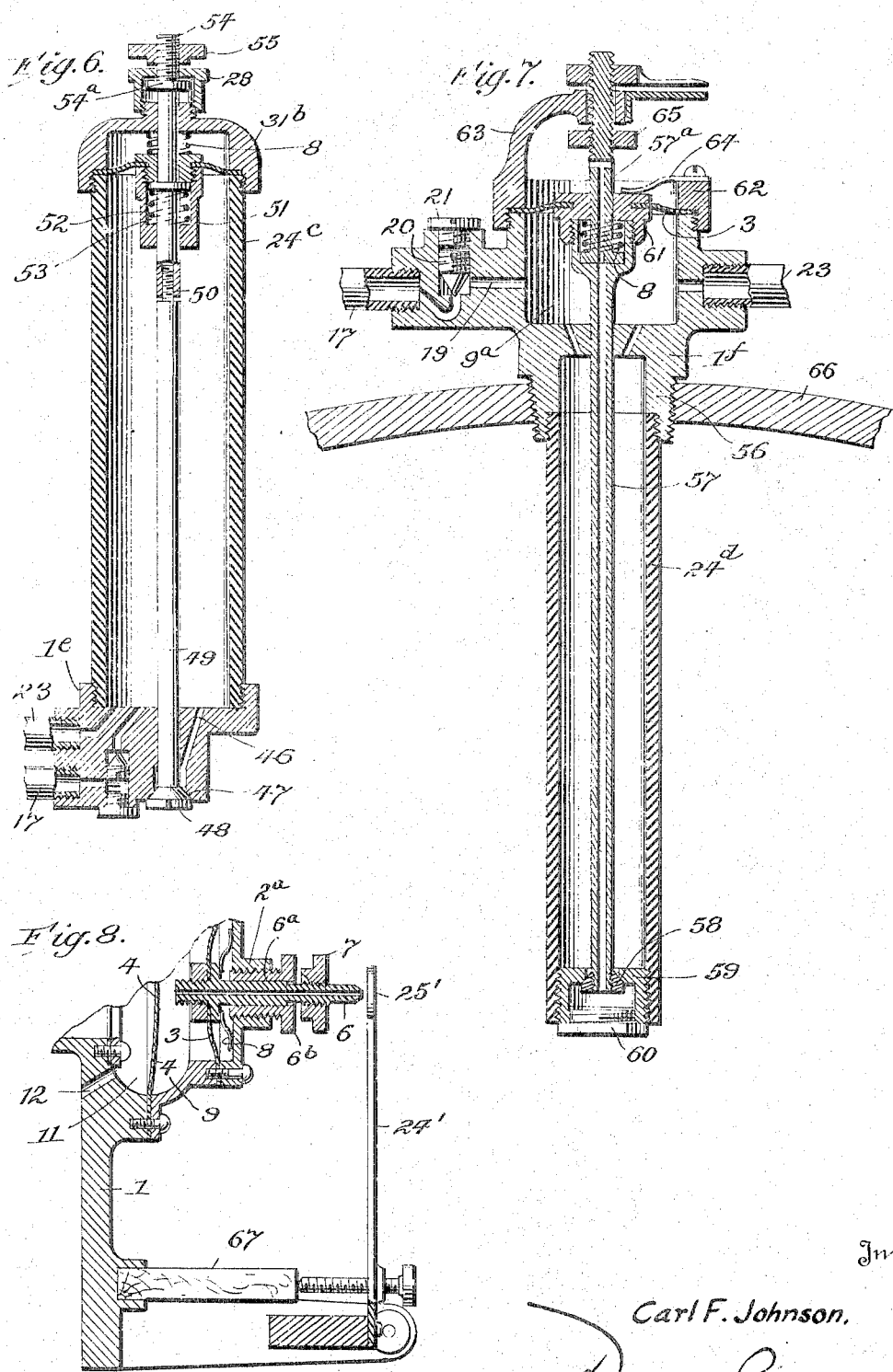

UNITED STATES PATENT OFFICE.

CARL F. JOHNSON, OF MILWAUKEE, WISCONSIN.

AUTOMATIC CONTROL DEVICE.

1,312,253. Specification of Letters Patent. Patented Aug. 5, 1919.

Application filed March 12, 1918. Serial No. 221,988.

*To all whom it may concern:*

Be it known that I, CARL F. JOHNSON, a citizen of the United States, residing at Milwaukee, in the county of Milwaukee and State of Wisconsin, have invented certain new and useful Improvements in Automatic Control Devices, of which the following is a specification.

This invention pertains to thermostats, humidostats, and like instruments, wherein an element responsive to atmospheric changes, as temperature or humidity, alternately vents and seals a leak-port of a fluid pressure motor, and thereby causes said motor directly or intermediately to open and close a supply pipe in communication with a source of heat or of moisture, as the case may be, or to perform like work.

In patents granted to me September 8, 1914, numbered 1,109,993, and November 30, 1915, numbered 1,162,170, I have described and claimed instruments or control devices of the general type to which the present invention pertains, and in connection with one of which I shall here describe and show it; but it is clearly to be understood that these are taken for illustration merely, as the improvements are applicable to such instruments generally, where a leak-port is controlled by a member responsive to atmospheric changes.

The present improvements are designed to permit variation of the range of movement permitted to the element responsive to atmospheric changes in passing from its sealing to its unsealing position and vice versa, instead of having such range permanently fixed or limited to a definite number of degrees either way from a predetermined normal.

In the structure set forth in Patent 1,162,170 above mentioned, the leak-port is formed in a pipe or nipple which is bodily movable to a very limited and fixed extent, and as the opening and closing of the leak-port is effected by movement of the element responsive to atmospheric changes toward and from the leak-port tube or nipple, only a small variation in temperature or humidity may be had between the two operating extremes or limits. While, therefore, the pneumatic control system is in many ways preferable to the older electric control of the earlier Johnson system, it has until the present invention lacked the capability of ready adjustment to varying range of temperature or of humidity between the sealing and venting points. It is to bring to the pneumatic system this wider play and ready variation of range, that this invention is designed.

Figure 5:
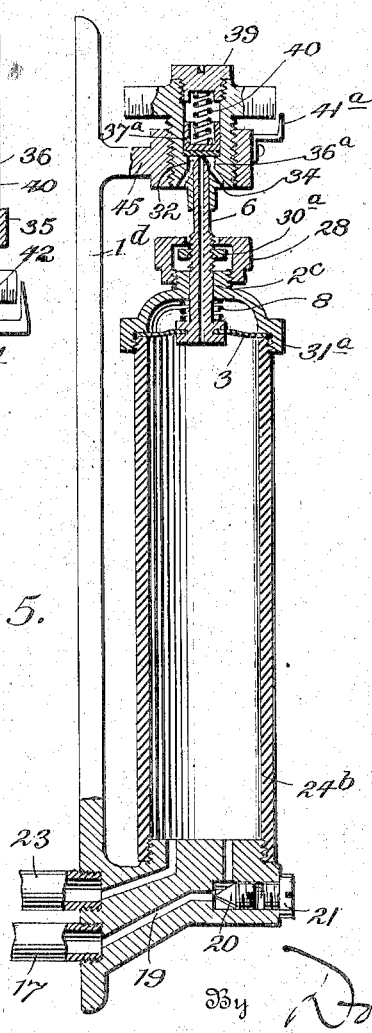
Figure 4:
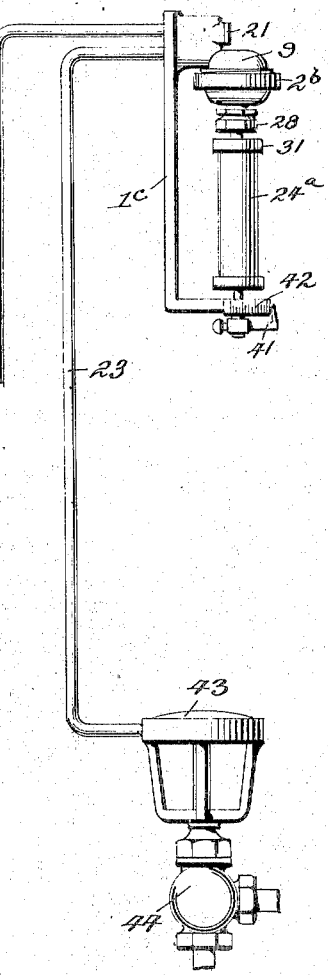

Various embodiments of the invention are illustrated in the accompanying drawings, wherein:

Figure 1 is a vertical sectional view of a thermostat such as shown in Patent No. 1,162,170, with my present improvements added;

Fig. 2, a sectional view of the leak-port tube or nipple with limiting stop, constructed as a unit device for application to control instruments of varying types;

Fig. 3, a sectional view of a thermostat in which the element having the higher co-efficient of expansion is in the form of a tube, the same being equipped with my improvements;

Fig. 4, a diagrammatic view showing such thermostat connected with and serving to control the fluid pressure motor of a valve governing the delivery of a heating or moistening agent;

Fig. 5, a sectional view of a modified form of such thermostat provided with the movable leak-port tube or nipple and stop devices;

Fig. 6, a similar view of another embodiment of my invention in a thermostat employing the tubular element;

Fig. 7, a sectional view of a thermostat equipped with my improvements, and designed to have the sensitive element introduced into a tank or chamber where it shall be in immediate contact with the liquid, gas, or vapor contained therein;

Fig. 8, a sectional view of a humidostat or hygrostat, provided with the movable leak-port tube or nipple and range-determining stops.

Referring first to Fig. 1, the general features of which are fully set forth in Patent No. 1,162,170, the numeral 1 indicates the wall plate or frame of the thermostatic device, and 2 the front or cover-plate thereof, said parts being so fashioned as to form a hollow body which is divided into several distinct chambers 9, 10 and 11 by partitions 3, 4, and 5. Diaphragm 3 is made fast to and serves to move a leak tube or vent member 6, which is loosely and slidably mounted in an exteriorly-threaded nipple 6ª, screwed into an internally threaded neck 2ª of the front plate 2. Nipple 6ª has a head 6ᵇ at its outer end, which may be of polygonal form, milled, or otherwise adapted for ready turning for purposes of longitudinal adjustment relatively to the front plate 2. Back of the front plate 2, or within the chamber of which said plate forms the outer wall, leak tube 6 is formed or provided with a flange 6ᶜ, between which and a nut 6ᵈ screwed upon the threaded inner end of tube 6, the diaphragm 3 is clamped. Between the front plate 2 and flange 6ᶜ is interposed a light spring 8, tending, when not opposed by superior force to move the leak tube 6 rearwardly and thereby to flex the diaphragm inwardly.

Forward of or beyond the nipple 6ª the leak tube 6 is provided with an external screw thread to receive an adjustable stop nut 7, which limits the inward movement of said leak tube 6, the outward movement of which is limited and determined by the flange 6ᶜ and nipple 6ª, against the inner end of which said flange abuts, when the leak tube moves outward.

It will be observed that the adjustable stop or nut 7 here takes the place of the integral stop collar 7 of Patent No. 1,162,170, and that nipple 6ª provides an adjustable stop or abutment for flange 6ᶜ, in place of the fixed abutment of said patent. Instead of a fixed range of movement of one or two one-thousandths of an inch contemplated and usually provided under the former construction, I am enabled to give a much wider range of movement to the leak tube 6, and to vary the play at will within the extreme limits of such wider range.

The diaphragm 3 may be of thin resilient metal, but is preferably made of quite flexible material, as leather or rubber fabric, to permit considerable play or flexure. Its office is to urge the leak tube 6 inward, but to allow it to move outward under moderate pressure in the chamber 9, to the left of diaphragm 3.

The chamber 10 to the right of said diaphragm 3, is open to the atmosphere by reason of a loose fit of the leak tube in the nipple 6ª, so that the pressure in chamber 10 is practically constant, and has no function in the operation of the device.

Chamber 9 is separated from chamber 11 by the diaphragm 4, which is relatively flexible, being made of any suitable material impervious to air, as leather, rubber fabric, or the like.

Chamber 11 opens to the atmosphere through an exhaust port 12.

To the rear of chamber 11 is a chamber 22, and to the rear of chamber 22 is a chamber 27, said chambers 22 and 27 being separated by a cross wall or partition 26, which carries a slideway 15 for the tubular stem of a valve 13, which in the position indicated in Fig. 1, seals a port 16 formed in the cross wall or partition 26. The tubular form of the stem of valve 13 provides a longitudinal exhaust port 14, through which chamber 27 and pipe 23 in communication therewith may be vented to exhaust-chamber 11, and thence by port 12 to the atmosphere.

17 indicates a pipe which in use is placed in communication with an accumulator, reservoir, or source of fluid under pressure. Said pipe communicates by a reduced port or passage 19, regulated by a needle valve 20 with chamber 9; and by another port or passage 18 with chamber 22. When the supply port 16 is unsealed by valve 13, chamber 22 communicates with chamber 27 and pipe 23, which latter connects with the motor to be operated. This is commonly a diaphragm motor actuating a damper, or a valve controlling delivery of a heating or moistening medium, as steam or water. Figs. 1 and 4 show in outline such a motor and valve, in common form.

The parts above described are so arranged and adjusted that when diaphragm 4 moves to the left it first seals the exhaust port 14, and then moves the valve member 13 bodily rearward, thereby unsealing supply port 16. Pressure of air or other fluid acting against the rear or left face of diaphragm 5 constantly urges it outward or to the right, and when pressure in chamber 9 to the right of diaphragm 4 falls, valve 13 will be moved by diaphragm 5 outward or to the right and caused to seal supply port 16, after which pipe 23 and chamber 27 will be vented to the atmosphere by port 14, chamber 11, and port 12.

Valve 13 and its co-acting parts constitute merely a supply and exhaust valve serving to supply pressure fluid to and release it from a secondary motor of any suitable type, connected with pipe 23. As in the case of the structure of Patent No. 1,162,170, so in the present instance I may substitute for this valve 13 any suitable mechanism operable by the diaphragm 4 or similar primary motor and adapted to control the operation of a secondary motor.

24 indicates a bimetallic thermostatic bar such as commonly employed in thermostats of the Johnson system. By reason of the different co-efficients of expansion of the two metals or substances employed, such bar bends or flexes one way under rise of temperature, and in the reverse direction on fall of temperature. One end of such bar is held fixedly in place (after initial setting or adjustment), and the other end or free portion is provided with a pad or facing 25 of leather or other suitable material, adapted when pressed against the end of leak tube 6, to seal the same. Any other suitable type of thermostatic device may of course be substituted for the bimetallic bar, but the pad movable to and from and alternately serving to seal and unseal the minute leak port, permits of a sensitive control and close regulation not obtainable by most other constructions. This is hence the preferred form of thermostatic element and seal.

Usual means may be provided for initial adjustment of the support of the thermostatic element, but this being well understood need not be described here.

It will be observed by reference to Fig. 1 that with the parts in the positions there shown, the valve-pad or face 25 is held away from the leak tube 6 by the bimetallic bar 24. The needle valve 20 is so adjusted as to restrict the flow through port 19 to a point less than the capacity of the leak tube 6, so that said leak tube may effectually vent the chamber 9, and prevent any accumulation of pressure therein while the leak tube is unsealed. From this it follows that diaphragm 4 stands in its right-hand or forward position, and permits a closing of supply port 16 and a venting of pressure from pipe 23 and its connected motor, as above explained.

It will also be seen that the diaphragm 3, pressed inward by spring 8 or bowed inward by reason of its own resilience, maintains the leak tube 6 in its inward or left-hand position when the parts are in the relations shown and described. If, now, in consequence of the change of temperature, the bimetallic bar 24 moves valve face 25 toward leak tube 6, the following action takes place: The retardation of flow through the leak tube 6, which begins as the pad or valve-face 25 closely approaches the end of said tube, will cause a rise of pressure in chamber 9, which, acting upon diaphragm 3, will force the same to the right thereby moving the leak tube and causing its end to press firmly against the valve-face 25, thus sealing the leak-passage through said tube, such movement of the leak tube continuing until its flange 6$^c$ abuts against the inner end of nipple 6$^a$. Immediately this sealing takes place, pressure will rapidly rise in chamber 9, forcing diaphragm 4 to the left so as to seal the port 14 and to move valve 13 from its seat around port 16, thereby opening said port. Air will thereupon flow through pipe 17, chamber 22, port 16, and chamber 27 to the pipe 23, and thence to the damper-motor, or other place of final use.

Upon a subsequent and reverse change of temperature, a very slight movement of valve-pad or face 25 away from leak tube 6 will initiate a venting of chamber 9 sufficient to cause diaphragm 3 to move the leak tube 6 to the left to an extent limited and determined by the adjustable stop-nut 7 on the outer portion of the leak tube coming into contact with the outer end of nipple 6$^a$. Such movement, quickly effecting a wide separation of the nipple and the valve-face or pad 25, insures a rapid discharge from the chamber 9 and a quick movement of diaphragm 5 to the right, with consequent closing of supply port 16 by valve 13 and opening of exhaust port 14, which in turn vents the damper-motor or other ultimate device, permitting it to move in a reverse direction from that in which it was previously actuated by the fluid pressure.

Fig. 2 shows the leak port mechanism of Fig. 1 embodied in a unit structure for application to control apparatus of any type adapted to receive it. In this the outer plate 2, diaphragm 3, leak tube 6, nipple 6$^a$, and adjustable stop-nut 7 are of the same construction and arrangement as in Fig. 1, but chamber 9 is formed as a special or detached shell 1$^a$, provided with a threaded nipple 1$^b$ to screw into a frame having the remaining elements of Fig. 1, or their equivalents.

In Fig. 3 I have illustrated the invention as applied to a type of thermostat in which the element having a relatively high coefficient of expansion takes the form of a tube 24$^a$, and is arranged to effect by its longitudinal expansion and contraction, the sealing and unsealing of a leak tube 6 carried by a diaphragm 3, which is pressed backward or upward by a spring 8 as in the structure shown in Figs. 1 and 2. The main frame of the instrument, 1$^c$, is essentially as in Fig. 1 except that the portion containing the diaphragm chamber 9 is arranged in a horizontal instead of a vertical position. The supply pipe 17 with its port 19, needle valve 20, and sealing screw 21 are unchanged. The cap or cover-plate 2$^b$ is arranged to screw upon the threaded circumference of the shell of chamber 9, and to clamp the diaphragm 3 between said parts. Cap or plate 2$^b$ is provided with a projecting neck or nipple 2$^c$, exteriorly threaded to receive a stop collar or nut 28 adjustable on the neck 2$^c$, and held against turning by a lock-nut 29. Leak tube 6 is provided with a collar 30, which on the upward or inward movement of diaphragm 3 is arrested by the end of the neck 2$^c$, and on the reverse movement is arrested by the adjustable collar or nut 28. By varying the adjustment of the collar 28 the range of movement of the leak tube may be varied as desired.

The tubular element 24ª of the thermostat is provided with a cap 31 having a central cavity 32, which receives the end of leak tube 6, whereby each serves to guide the other, the bottom of said cavity being closed and preferably faced with leather or equivalent, to form a closure 33 for the end of the leak tube. The cavity 32 communicates with the atmosphere by a port or ports 34, so that when the valve-pad or closure 33 and the leak tube 6 are slightly separated, chamber 9 may exhaust to the atmosphere through said ports 34. The lower end of the tube 24ª carries a cap 35 containing within the tube an upward tubular extension 36, within which is placed a sliding plug 37 which rests upon the upper end of a supporting and adjusting screw or spindle 38. The tubular extension 36 of plate 35 is closed by a screw-threaded cap between which and the plug 37 is interposed a spring 40. The purpose of this arrangement is to provide a yielding support for the tube 24ª, which shall give way in the event of abnormal expansion of said tube, and thus prevent overstressing of the parts of the mechanism, the spring being, however, normally inert and maintaining the base or lower cap 35 at a fixed level or elevation.

The initial adjustment of the spindle 38 and consequently of the tube 24ª is made by screwing the same up or down in its seat in the frame 1ᶜ, and to the end that this adjustment may be made with nicety and with reference to predetermined normal temperature, the spindle is provided with a radial arm 41 having an upturned end or pointer which moves over a scale 42 concentric with the spindle.

Chamber 9 communicates by a suitable port 18ª with a pipe 23 which connects with the diaphragm-motor 43 of a valve 44 indicated in Fig. 4, or with other device to be supplied with or actuated by fluid pressure. In this form of the apparatus as here illustrated, the diaphragms 4 and 5 and attendant parts are omitted. They may, however, be employed as in Fig. 1, the illustration being designed merely to show the adaptability of the adjustable stop to the leak tube, as applied to that type of thermostat or control mechanism, comprising a restricted inlet port, a vent port thermostatically controlled, and a diaphragm-operated valve or damper. In other words, this figure illustrates a form of thermostat which does not employ secondary control mechanism, such being within the purview of the present invention.

In Fig. 5 I have shown a modification of the structure last described, in which the parts are substantially reversed. The inlet pipe 17 is here connected with a port 19 in the base of the frame, controlled as before by a needle valve or conical screw 20 inserted through an opening sealed by a screw plug 21, the pipe 23 communicating with the base of the tube 24ᵇ by a suitable port. The upper end of the tube 24ᵇ carries a cap 31ª which takes substantially the form and construction of cap 2ᵇ of Fig. 3, having the neck or extension 2ᶜ upon which is threaded a nut or stop collar 28, between which and the end of extension 2ᶜ plays a collar 30ª carried by a leak tube 6, which in turn slides through the extension 2ᶜ and is supported and actuated by a diaphragm 3 subject to the pressure fluid entering through pipe 17. A spring 8 serves to move the diaphragm and leak tube downward or inward when the tube 24ᵇ is vented to the atmosphere.

The relief device in Fig. 5 is applied to the sealing member of the leak tube 6, which member is in the form of a sliding plug 37ª movable in a tubular housing 36ª externally threaded and screwed into a correspondingly tapped bracket 45 of main frame 1ᵈ. The housing 36ª carries at its top a circular enlargement, the circumference of which is graduated to form a scale which is read in connection with an indicator 41ª secured to the bracket 45. The housing 36ª is formed with an internal shoulder which limits the descent of the sliding plug 37ª, which plug is pressed to said shoulder or seat by a spring 40 held in place within the housing by a cap-screw 39. The upper end of the leak tube 6 enters a cavity 32 formed in the lower end of housing 36ª, and provided with a vent or vents 34, the same as in Fig. 3.

Collar 30ª is in the form of a nut screwed upon the threaded exterior of leak tube 6, and may hence be adjusted as desired. Similarly, stop collar 28 may be adjusted relatively to said nut and to neck 2ᶜ. In this way the limits of movement of the leak tube 6 may be determined.

In Fig. 6 I employ the same mounting for the tube 24ᶜ as is employed for the tube 24ᵇ of Fig. 5, and the inlet and outlet ports are to all intents and purposes the same. The leak port is, however, formed in the lower bracket or tube support of the frame 1ᵉ, as indicated by the numeral 46, said port terminating at the under side of the bracket in a conical seat 47 for a valve plug 48 formed on the lower end of a stem 49 which extends upward axially into and through the major portion of tube 24ᶜ.

The stem 49 is made in two parts connected by a screw-threaded joint 50, which permits elongation or contraction of the stem by screwing said parts together or partially unscrewing one from the other. The upper member of the stem 49 terminates in a head or enlargement 51, which rests upon a spring 52 contained within a housing 53, screwed or otherwise made fast to the lower end of a stem 54 which is centrally clamped to the diaphragm 3. The periphery of diaphragm 3 is clamped between the end of tube $24^c$ and a cap $31^b$, a spring 8 being interposed between said cap and a clamping disk or collar of said diaphragm carried by stem 54. This stem 54 plays freely through a neck formed upon the cap $31^b$, and is provided with a collar $54^a$ which as the diaphragm moves, plays between the neck $2^c$ and a stop-nut or collar 28 threaded upon said neck. The upper extremity of stem 54 is screw threaded and provided with a stop-nut 55. The valve plug 48 has substantially the form of a wood screw-head, and is nicked to receive a screw driver or other turning implement whereby the two parts of stem 49 may be screwed together, or unscrewed to a sufficient extent to give proper adjustment of the length of the rod as a whole.

Under this arrangement the spring 52 constitutes a relief device to guard against over-stressing of the parts in the event of abnormal elongation of tube $24^c$, and the nut 55, collar or nut 28, and collar $54^a$ form the limiting stops which determine the range of movement of the parts, and the consequent limits of temperature within or between which the device opens and closes the leak port.

Fig. 7 shows the apparatus in a form for application to tanks, vessels, or chambers, to the temperature of whose contents the thermostatic element is to be subjected. In this the frame $1^f$ consists of a casting tapped to receive at one side the pressure fluid supply pipe 17, and at the other side the pressure delivery pipe 23, the casting being preferably formed with a threaded neck 56 whereby it may be screwed into a wall of the tank or receptacle. $24^d$ indicates the tubular thermostatic element, having a high co-efficient of expansion, here shown as screwed into the neck 56 of frame or casting $1^f$ in position to extend into and be contained wholly within the tank or chamber. Passing axially through the tube $24^d$ is a smaller tube 57, the lower end of which is provided with a conical valve member 58 which may be screwed upon the lower end of tube 57. Valve 58 seats against the under side of the inwardly turned flange of an annular collar 59 screwed into the lower end of tube $24^d$, and in turn closed at its lower end by a screw plug or cap 60. Said tube 57 slides through an opening in the casting $1^f$, and at its upper end is enlarged to receive the T-head or flange of an extension member $57^a$, the upper portion of which is exteriorly screw threaded.

The enlarged upper end of tube 57 is screwed into or otherwise made fast to a central hub or boss 61 of a diaphragm 3, which is clamped to the upper end of casting or body $1^f$ by a clamping ring 62 formed or furnished with a bracket 63 which overhangs the diaphragm, and through which plays the threaded upper end of extension $57^a$ of tube 57. Encircling extension $57^a$ and bearing at its lower end upon the upper side of the flange thereof, is a spring 64, the upper end of which bears against the under side of boss 61 of diaphragm 3. The office of spring 64 is to maintain the flanged lower end of extension $57^a$ normally in contact with the tube 57, and to cause the two sections of the tube to move as one, ordinarily, but to yield in the event that the tubular member $24^d$ of the thermostat lengthens to such an extent as would otherwise result in over-stressing any part of the structure.

The casting $1^f$ is formed with a circular space or chamber $9^a$, of which diaphragm 3 forms a top or closure, and with which supply pipe 17 communicates by a port 19, controlled as to capacity by a needle valve or cone-pointed screw 20, inserted through an opening sealed by a screw 21. A delivery pipe 23 connects the chamber 9 with the damper motor or other device to be operated, as shown and explained in connection with Figs. 1 and 4. Bearing upon the upper side of the boss 61 of diaphragm 3 is a spring 8, which is relatively light or weak as compared with spring 64. Its office is to flex the diaphragm 3 downward or inward when not opposed by a superior force.

65 indicates a nut screwed upon the threaded end of extension $57^a$, below the overhanging upper end of bracket 63. This nut constitutes an adjustable stop to limit and determine the movement of leak tube 57. An indicator arm or pointer screwed upon the upper end of extension $57^a$ and resting upon the bracket 63, serves, when swung in one or the other direction, to raise or lower the leak tube 57, $57^a$, and to adjust its valve 58 relatively to the seat in collar 59. The leak ports of extension $57^a$ are shown opening laterally from its central bore or passage, to avoid unduly weakening the threaded portion of such extension, but this is not essential. Communication between the interior of thermostatic member $24^d$ and chamber 9 is afforded by ports formed in casting $1^f$, or by a loose fit of tube 57 therein.

The device constructed as above explained and placed in communication with a source of fluid under pressure, operates as follows:

Assuming that the contents of the tank or chamber 66 be of sufficiently high temperature, the parts will stand in the positions indicated in Fig. 7, with valve 58 seated and leak tube 57 out of communication with chamber 9. So long as the temperature is maintained and valve 58 remains seated, pressure will build up in chamber 9, diaphragm 3 will be maintained in its upwardly flexed position, and valve 58 will be held to its seat. If, however, the temperature falls, the tubular member 24$^d$ of the thermostat will contract or shorten, thus carrying the valve seat away from valve 58, and venting chamber 9 and pipe 23 through the port or ports in casting 1$^t$ to the interior of tubular member 24$^d$, and by way of leak tube 57 and extension 57$^a$ to the atmosphere. Escape of pressure fluid from chamber 9 permits diaphragm 3 to collapse or fall, thereby lowering the leak tube and fully and promptly opening the valve 58, so that the venting shall be rapid and complete. Pipe 23 being thus vented, the valve or dampermotor will be actuated to cause a further heat supply, which, heating the contents of the tank or chamber 66, will cause the tubular member 24$^d$ to lengthen and to carry the valve seat into contact with valve 58, thereby sealing the leak port, causing the pressure to build up in chamber 9 and in pipe 23 and the connected valve or damper-motor, and shutting off the heat supply. The action is rendered prompt by upward flexing of diaphragm 3 through accumulating pressure beneath it in chamber 9, and consequent lifting of leak tube 57 and movement of valve 58 toward the advancing valve seat. The extent of this movement is determined and controlled by the nut or adjustable stop 65.

In Fig. 8 I have illustrated a structure identical with that of Fig. 1 except that the leak port valve 25' is carried by a resilient bar 24' which tends to move toward and to close the leak tube 6, but which is controlled as to its position by a block 67 of wood or other material which expands in a moist atmosphere and contracts in a dry atmosphere. Under this arrangement the leak port will be sealed and pressure fluid will be supplied to a motor which opens the valve controlling delivery of moisture to the surrounding atmosphere. When the proper degree of humidity is restored the block 67, expanding, will force back the bar 24', unseat valve 25', vent the valve motor, and shut off the supply of moisture. Adjusting devices for bar 24' may be provided, as in Fig. 4 of Patent No. 1,162,170.

As explained in said Patent No. 1,162,170, the distinctive feature of the type of instrument to which my present invention is applied is that it provides a quick acting vent valve, which moves so promptly from full open to full closed position as to obviate the necessity of a quick throw device between the control diaphragm or primary motor and the control mechanism. This not only avoids the complication incident to such a quick throw device, but, provides a valve which is much more sensitive than those of earlier forms, and which has no neutral position. In other words, the essential characteristic of this type is the quick-acting thermostatic vent valve, in combination with a primary pressure motor such as the diaphragm 4 of Fig. 1. This primary motor may, as shown, actuate a control valve to regulate the operation of a secondary fluid pressure motor, or it may actuate any other type of control mechanism, adapted to control the operation of any other corresponding type of secondary motor, such devices being known equivalents in the art.

The primary motor may be used to operate a wide range of devices and is applied to such use. It is also evident that the vent valve may take different forms, so long as the essential feature is retained, or so long as the valve comprises co-acting elements, one of which is movable by a thermostatic, hygrostatic, or other responsive element affected by changes of atmospheric condition, and the other of which is moved in a closing direction by an initial increase of pressure in the chamber 9, and in an opening direction by an initial decrease of pressure in such chamber.

The present invention consists in the provision of an adjustable stop or stops to limit and determine the range of movement of the pressure-actuated element of such valve, whereby the range of temperature variation within which, or the limits between which, said valve shall act, may be varied and determined, but a prompt opening at one limit of said range and a quick closing at the other extreme, shall be effected.

The thermostat here described in each and all the embodiments illustrated, and in other variants thereof that will readily suggest themselves to those skilled in the art, automatically supplies an alternating high and low temperature which is desirable in certain manufacturing and laboratory processes, in certain machines, and in other equipment where it is desirable to have these alternations in temperature made automatically and repeatedly or periodically with machine-like precision in contrast with all former thermostats or thermostatic controllers of the leak port type of which I am aware, such prior devices being specially designed and intended to maintain the temperature constant or as nearly constant as is practicable.

In the claims I make use of the term "abutment" to include such devices as pistons, diaphragms, etc., all of which are well known equivalents in the art.

The term "responsive element" in the claims includes thermostatic, hygrostatic, and other elements subject to a change of form or dimension in response to changes in atmospheric condition.

Having thus described my invention what I claim is:—

1. The combination of a fluid pressure motor; a source of fluid pressure in communication therewith; a leak port member for said motor, adapted to be moved by pressure within said motor; a closure for said leak port member located in line therewith, having automatic actuating means responsive to changes in atmospheric condition, said leak port member being movable toward said closure upon a rise of pressure in said motor, whereby a quick sealing is effected; and an adjustable stop for the movable leak port member, whereby the range within which opening and closing of the leak port is effected may be varied.

2. The combination of a fluid pressure motor; a source of fluid pressure communicating therewith; a leak port member for said motor movable under variations of pressure in said motor; a closure for said leak port member located in line therewith, having automatic means responsive to changes in atmospheric condition, said leak port member being adapted to move away from said closure upon a fall of pressure in said motor to effect a quick venting; and an adjustable stop to limit and determine the movement of said leak port member, and thereby to determine the limits of atmospheric change at which opening and closing of the leak port shall respectively occur.

3. The combination of a control mechanism for a motor; a fluid pressure actuated abutment adapted to operate said control mechanism; a source of fluid pressure in communication therewith; a vent valve mechanism responsive to changes in atmospheric condition, adapted to vent fluid pressure acting on said abutment; a pressure-actuated device subject to the fluid pressure acting on said abutment, and adapted to co-act with the vent valve mechanism to close the same upon an initial increase of fluid pressure and to open the same upon an initial decrease of pressure; and an adjustable stop to limit and determine the range of movement of said vent valve mechanism.

4. The combination of a control mechanism for a motor; a fluid-actuated abutment adapted to operate said control mechanism; a source of fluid pressure communicating therewith; a vent valve mechanism responsive to changes in atmospheric condition adapted to vent fluid pressure acting on said abutment; a diaphragm spring-pressed in one direction and subject to the fluid pressure acting on said abutment in the reverse direction, adapted upon an initial increase of such pressure to close said vent valve and upon an initial decrease in said pressure to open said vent valve; and an adjustable stop serving to limit and determine the movements of the vent valve mechanism.

5. The combination of a control mechanism adapted to control the operation of a motor; a fluid-pressure-actuated abutment adapted to operate said control mechanism; a source of fluid pressure in communication therewith; a movable valve member having a port adapted to vent pressure from said abutment; a second movable valve member adapted to co-act with the first movable valve member to control the vent port therein; a responsive element operatively connected to move one valve member in response to variations in atmospheric condition; a pressure-actuated device subject to the pressure acting on said abutment and adapted to co-act with the other valve member to move the same in a closing direction upon an initial increase of such pressure and in an opening direction upon an initial decrease in such pressure; and an adjustable stop serving to limit and determine the movement of said pressure-actuated device.

6. The combination of a control mechanism adapted to control the operation of a motor; a fluid-pressure-actuated abutment adapted to operate said control mechanism; a source of fluid pressure in communication therewith; a movable valve member having a port adapted to vent pressure from said abutment; a second movable valve member adapted to co-act with the first movable valve member to control the vent port therein; a responsive element operatively connected to move one valve member in response to variations in atmospheric condition; a diaphragm spring-pressed in one direction and subject to the pressure acting on said abutment in the opposite direction, adapted to co-act with the other valve member to move the same in a closing direction upon an initial increase in such pressure and in an opening direction upon an initial decrease therein; and an adjustable stop to limit and determine the range of movement of said port-containing valve member.

7. The combination with a control mechanism including a pressure chamber and a source of fluid pressure communicating therewith, of a valve member having a sealing face; a responsive element adapted to move said valve member; a vent tube adapted to vent pressure from said chamber and mounted to move toward and from said sealing face to close and open said tube; an abutment subject to pressure in said chamber and connected to said vent tube to move the same toward said sealing face; resilient means opposing such movement; and an adjustable stop serving to limit and determine the movement of said vent tube.

8. The combination with a control mechanism including a pressure chamber and a source of fluid pressure communicating therewith, of a valve member having a sealing face; a responsive element adapted to move said valve member; a vent tube adapted to vent pressure from said chamber and mounted to have movement toward and from said sealing face to close and open said tube; a resilient diaphragm connected to said tube, subject to the pressure in said chamber, and adapted to urge said tube toward said sealing face in opposition to the resilience of said diaphragm; and an adjustable stop to limit and determine the movements of said vent tube.

9. The combination with a control mechanism including a pressure chamber and a source of fluid pressure in communication therewith, of a movable valve having a sealing face; a responsive element adapted to move said valve; a vent tube adapted to vent pressure from said chamber and mounted to have a movement toward and from said sealing face; a mechanism subject to pressure in said chamber, connected to said vent tube, and adapted to move the latter into sealing engagement with said sealing face upon an initial rise of pressure in said chamber and out of such engagement upon an initial fall of such pressure; and an adjustable stop serving to limit and determine the extent of movement of said vent tube.

10. A vent valve for a pressure motor control device, comprising a vent tube mounted to permit longitudinal movement; a responsive element having a sealing face movable under changes of atmospheric condition into and out of sealing relation with the end of said tube; an abutment connected to said tube and subject to the pressure to be vented, urging said tube toward said sealing face; resilient means acting in opposition to the pressure on said abutment; and an adjustable stop serving to limit and determine the extent of movement of said vent tube.

11. A vent valve for a pressure motor control device, comprising a vent tube mounted to permit longitudinal movement; a responsive element having a sealing face movable under changes of atmospheric condition into and out of sealing relation with the end of said tube; a diaphragm connected to said tube, spring-pressed in one direction and subject to the opposing pressure to be vented, acting to move said tube toward said sealing face; and an adjustable stop serving to limit and determine the extent of movement of the vent tube.

12. A vent valve for a pressure motor control device, comprising a valve member having a vent port; a second valve member co-acting with the first to control said vent port; a responsive element adapted to move one valve member in response to variations in atmospheric condition; a pressure actuated device subject to the pressure to be vented and adapted upon a rise of such pressure to move the other valve member toward said closed position and upon fall of such pressure, toward open position; and an adjustable stop to limit the movements of said valve member.

13. In a control device, a valve adapted alternately to supply and exhaust fluid pressure to and from a secondary device; means urging said valve toward exhaust position; a valve-actuating motor adapted under pressure to force said valve from exhaust to supply position; a responsive element having a sealing face adapted to move in accordance with variations of atmospheric condition; a vent tube adapted to vent pressure from said motor and to move into and out of sealing relation with said sealing face; an adjustable stop to limit and determine the movement of said vent tube; and a pressure-actuated device subject to pressure in said motor, connected to said vent tube, and adapted to move the latter toward said sealing face upon an increase of such pressure and away from said sealing face upon a decrease of such pressure.

14. In a control device, a valve adapted alternately to supply and exhaust fluid pressure to a secondary device, means urging said valve toward exhaust position; a valve-actuating motor adapted under pressure to force said valve from exhaust to supply position; a responsive element having a sealing face adapted to move in accordance with variations of atmospheric condition; a vent tube adapted to vent pressure from said motor and to move into and out of sealing relation with said sealing face; a spring-pressed diaphragm subject to opposing pressure in said motor, connected to said vent tube, and adapted to move the latter toward said sealing face upon an increase of pressure and away from said sealing face upon a decrease of pressure; and an adjustable stop to limit and determine the movement of said vent tube.

15. A vent valve for a fluid pressure control device including a movable member having a vent port; an adjustable stop serving to limit and determine the range of movement of said member; a valve member co-acting therewith to control said port; a responsive element adapted to move said valve member through variations in atmospheric conditions; and a pressure-actuated device subject to the pressure to be vented and adapted upon a rise of pressure to move the vent member toward its sealing valve.

16. An automatic control device of the character described, comprising a movable leak port member; a sealing device for said leak port, responsive to atmospheric changes; and an adjustable stop to limit and determine the range of movement of the leak port member.

17. An automatic control device of the leak port type, comprising a movable element provided with a leak port; a sealing device for said leak port responsive to atmospheric changes; and adjustable devices to determine the limits of movement of the leak port element, whereby the extent of such movement may be initially determined and the sealing device be caused to seal and unseal the leak port at the limits of predetermined range of variation in atmospheric conditions.

In testimony whereof I have signed my name to this specification.

CARL F. JOHNSON.